June 5, 1928.
V. HUGHES
1,672,220
BRAKE PEDAL CONSTRUCTION
Filed May 29, 1926
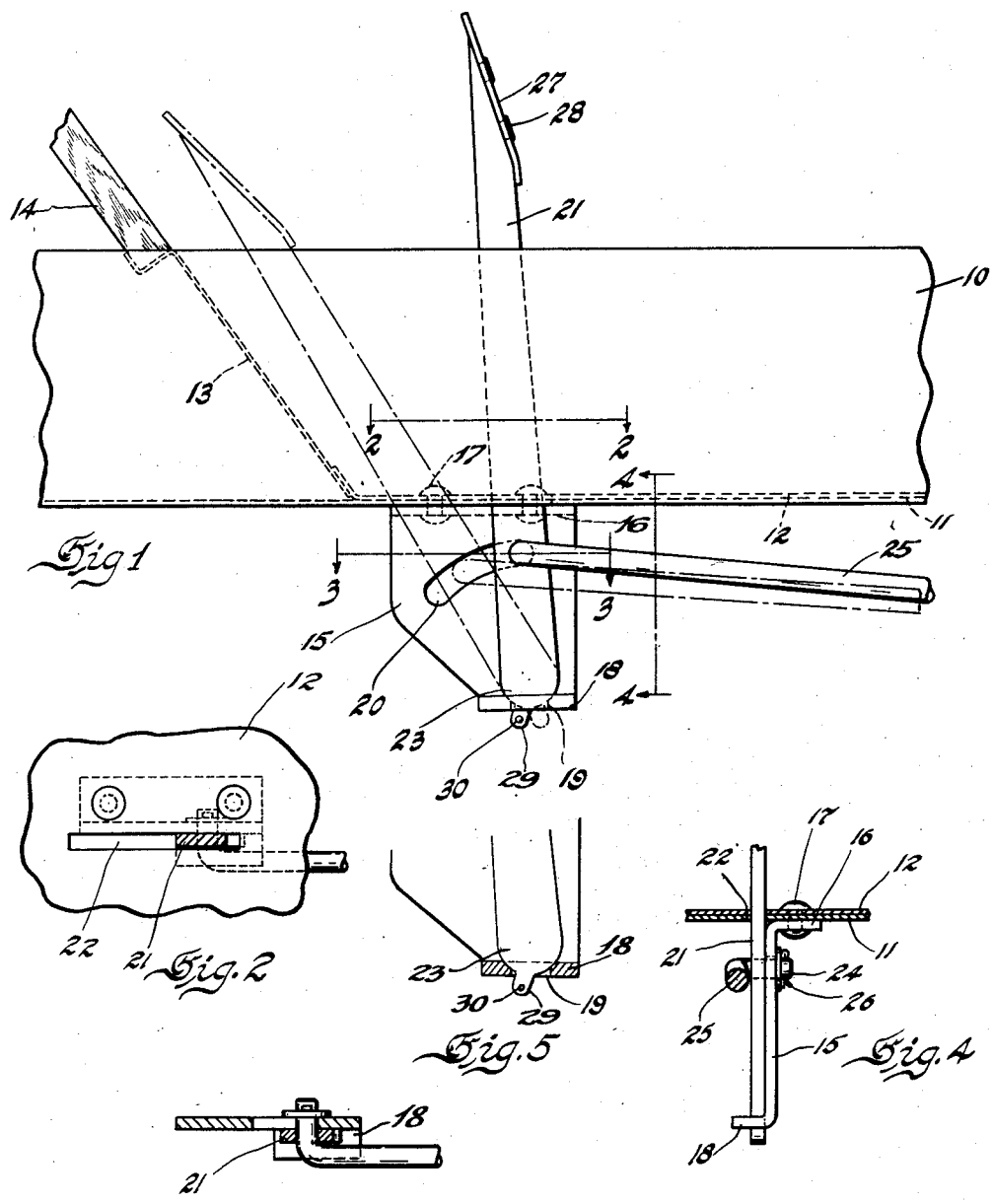
Inventor
Victor Hughes Patented June 5, 1928.

1,672,220

UNITED STATES PATENT OFFICE.

VICTOR HUGHES, OF DETROIT, MICHIGAN, ASSIGNOR TO GENERAL MOTORS RESEARCH CORPORATION, OF DETROIT, MICHIGAN, A CORPORATION OF DELAWARE.

BRAKE-PEDAL CONSTRUCTION.

Application filed May 29, 1926. Serial No. 112,627.

This invention relates to levers particularly adapted to operate motor vehicle brakes.

The object of the invention is simplification of the form and construction of a brake lever and of the means whereby it is mounted in the car. It comprises a foot controlled lever, composed preferably of flat steel stock, in combination with a step bearing into which the end of the lever may be inserted from above, linkage connecting the lever to the brakes, and a means for preventing accidental unstepping of the lever.

In the accompanying drawing in which like reference characters indicate like parts throughout the several views, Fig. 1 is a side elevation of a fragment of a motor car showing a brake operating lever and associated parts according to this invention;

Fig. 2 is a section on the line 2—2 of Fig.1;

Fig. 3 is a section on the line 3—3 of Fig.1;

Fig. 4 is a section on the line 4—4 of Fig. 1, and

Fig. 5 is a section through the step bearing for the lever.

In the drawing, 10 indicates a fragment of one of the fore and aft sills of a motor car. The sill may be an angle iron having a horizontal flange 11, to the upper side of which there may be riveted or otherwise secured a floor plate 12; 13 indicates the metallic portion of a toe board slanting upward from the floor, and 14 a wooden board that slants upward to the dash or forward partition of the body, not shown.

For the purpose of forming a fulcrum for a brake lever, bracket 15 is riveted or bolted to the floor plate 12, and flange 11 of the side sill 10. The upper end of the bracket 15 is flanged as at 16, rivets 17 securing the flange to the sill and floor; the lower end is bent to form a horizontal flange 18. Flange 18 is provided with an opening 19 which, in this instance, is a slot completely through it, the flange and opening constituting a step bearing or horizontal fulcrum support for the lever. The vertical portion of bracket 15 has an arcuate guide slot 20 for a purpose to be presently described.

A brake lever 21 is passed through slot 22 formed through the floor plate 12 and flange 11. Brake lever 21 has a lower rounded end 23 fitting in the opening 19 of the flange 18. The ends of the opening 19 are preferably chamfered or rounded on an arc of the same curvature as the end 23 of the lever thus forming bearing surfaces therefor. The shank of the lever passes through the said slot 22 and extends upward into a position convenient for a driver's foot.

The arcuate slot 20 functions as a guide for holding the lever properly to its seat on the flange 18 during its operation. In order that it may thus function, the lever 21 is equipped with a pin or lug engaging in and guided by the guide slot. In the form shown, the said pin may consist of one end 24 of link 25 by which the lever may be connected to the brake mechanism. The end 24 is provided with means for preventing it from slipping out of engagement with the arcuate guide slot and lever as by a washer and cotter pin 26. The slot 20 is, of course, formed about a center which is the axis about which the lever rocks.

The pedal plate 27 may be secured to the upper end of the lever 21 by rivets 28, the rivets being formed integral with the lever and inserted through holes in the pedal plate and then upset.

The lever may be stamped or sheared from wrought sheet steel stock, say ¼" thick, with rivets left projecting from the bevelled end as illustrated in Fig. 1.

Although it is not necessary to have any means other than the guide 20 and right angled end 24 of the link 25 to hold the lever to its seat, the lower end of the lever may be provided, if desired, with a projecting member 29 that protrudes below the flange 18 and may have a pin 30 passed through it.

The means described is simple in construction, strong, cheap and may be very easily installed in the car. It is only necessary to remove the cotter pin 26, and pull out link end 24 to enable the lever to be unstepped from its bearing, if the pin 30 is not used. If pin 30 is used, of course, it also must be pulled out. Re-assembly may be effected with equal ease. The means described is particularly well adapted for equipment of light motor cars, sometimes called "cycle cars".

What I claim is:

1. In a brake operating mechanism, a horizontal fulcrum support having a slotted opening, a brake lever having a curved end of greater width than the length of the slotted opening, stepped and fulcrumed in said slotted opening of the support.

2. In a brake operating mechanism, a fulcrum support having an opening, a brake lever having one end stepped and fulcrumed in the opening of said support, and guiding means confining the movements of said lever to an angular movement about the fulcrum axis.

3. Means as defined in claim 2, in which the guiding means consists of an arcuate guide curved in a plane parallel with that of the movements of the lever about an axis coincident with the axis of the lever, the lever being provided with a member engaging said guide.

4. Means as defined in claim 2 in which the guiding means is a member having an arcuate slot curved in a plane parallel with that of the movement of the lever and curved about an axis coincident with that of the axis about which it rocks, and a link connected with the lever, said link having a right angled end extending through a hole in the lever and through said arcuate slot.

5. In a brake operating mechanism, a horizontal fulcrum support having a slotted opening, a brake lever having a curved end, of greater width than the length of the slotted opening, stepped and fulcrumed in said opening on the fulcrum support, a projection on said lever extending through said opening and means on the projection to prevent unstepping of the lever.

6. In a brake operating mechanism a lever formed of malleable plate metal having integral rivets on its free end and a pedal plate riveted to said end by said integral rivets.

7. In a brake operating mechanism, a substantial horizontal support, a lever, one extremity of the lever having a pivotal support thereon, means laterally positioned relative to said lever to maintain said lever on its pivotal support and restrain its movement to oscillation about said support as a center.

8. In a brake operating mechanism, a horizontal fulcrum support, the support having a slot, a brake lever having a curved end fulcrumed in said slot, means to retain the lever upon its fulcrum support and to restrain its movements to a single plane.

9. In a brake operating means, a fulcrum support, a lever fulcrumed thereon, a plate in a plane parallel with the plane determined by the movement of said lever, said plate having an arcuate slot, means carried by the lever travelling in the slot for retaining the lever on its fulcrum support.

10. A lever, a plate in a plane parallel with the plane of movement of said lever, a second plate at right angles to said first plate, a slot in the second plate through which said lever passes, an arcuate slot in said first plate, means carried by said lever and travelling in said arcuate slot to assist in guiding said lever in its movement and to prevent its removal from its fulcrum.

In testimony whereof I affix my signature.

VICTOR HUGHES.